(12) United States Patent
Sheehy et al.

(10) Patent No.: US 9,650,561 B2
(45) Date of Patent: *May 16, 2017

(54) METHOD OF BIOLOGICAL PERMEABILITY MODIFICATION OF OIL RESERVOIRS USING RESIDENT MICROORGANISMS AND NUTRIENT SUPPLEMENTATION

(71) Applicant: TITAN OIL RECOVERY, INC., Beverly Hills, CA (US)

(72) Inventors: Alan James Sheehy, Minyama (AU); Bradley Ray Govreau, Spring, TX (US); Colin Kenneth Hill, San Dimas, CA (US); Michael Thomas Carroll, Glendora, CA (US); Brian W. G. Marcotte, Rolling Hills, CA (US)

(73) Assignee: Titan Oil Recovery, Inc., Beverly Hills, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/307,024

(22) Filed: Jun. 17, 2014

(65) Prior Publication Data
US 2014/0367088 A1    Dec. 18, 2014

Related U.S. Application Data

(60) Provisional application No. 61/836,394, filed on Jun. 18, 2013.

(51) Int. Cl.
| | | |
|---|---|---|
| E21B 43/22 | (2006.01) | |
| C09K 8/582 | (2006.01) | |
| C09K 8/60 | (2006.01) | |

(52) U.S. Cl.
CPC ............... *C09K 8/582* (2013.01); *C09K 8/60* (2013.01)

(58) Field of Classification Search
CPC .. C09K 8/582; C09K 8/58; C09K 8/60; B09C 1/10; B09C 2101/00; C02F 3/34;
(Continued)

(56) References Cited

U.S. PATENT DOCUMENTS

| | | | |
|---|---|---|---|
| 4,905,761 A | | 3/1990 | Bryant |
| 4,971,151 A | * | 11/1990 | Sheehy ............... C09K 8/905 166/246 |

(Continued)

*Primary Examiner* — Zakiya W Bates
(74) *Attorney, Agent, or Firm* — Zarley Law Firm, P.L.C.

(57) ABSTRACT

A method of increasing oil recovery from oil reservoirs includes the step of conducting a series of lab analysis that lead to a specific nutrient formulation followed by or in parallel with a genetic analysis of resident microorganisms in water produced from an oil reservoir to determine if the population of oil interactive microorganisms may be modified to produce a change in oil-water relative permeability of an oil reservoir. The series of analyzes are conducted to determine the contents of a specific nutrient formulation package to optimize changes in the resident microorganisms to enhance oil recovery by changing oil-water relative permeability in the oil reservoir. Next the specific nutrient formulation is applied to stimulate some of the resident microorganisms to interact with oil contained in the reservoir rock formations. The stimulation step is followed by limiting the specific nutrient formulation to alter or modify the physiology and surface characteristics of the targeted microorganisms.

12 Claims, 5 Drawing Sheets

(58) Field of Classification Search
CPC ......... C02F 2101/32; C12N 1/20; C12N 1/26; E21B 43/16; E21B 43/00; Y10S 423/17; C12R 1/01; C12R 1/00
See application file for complete search history.

(56) References Cited

U.S. PATENT DOCUMENTS

| | | | |
|---|---|---|---|
| 5,083,610 A | | 1/1992 | Sheehy |
| 5,368,099 A | * | 11/1994 | Davey et al. ................ 166/246 |
| 2001/0036667 A1 | | 11/2001 | Tayebi et al. |
| 2001/0045279 A1 | | 11/2001 | Converse et al. |
| 2010/0212888 A1 | * | 8/2010 | Hendrickson .......... C09K 8/582 |
| | | | 166/246 |
| 2011/0250582 A1 | * | 10/2011 | Gates et al. ...................... 435/3 |
| 2012/0261117 A1 | * | 10/2012 | Pavia ..................... E21B 43/16 |
| | | | 166/246 |
| 2012/0310614 A1 | * | 12/2012 | Beattie .................. E21B 43/16 |
| | | | 703/10 |
| 2014/0182840 A1 | | 7/2014 | Sheehy et al. |

\* cited by examiner

METHOD OF BIOLOGICAL PERMEABILITY MODIFICATION OF OIL RESERVOIRS USING RESIDENT MICROORGANISMS AND NUTRIENT SUPPLEMENTATION

CROSS REFERENCE TO RELATED APPLICATION

This application claims the benefit of U.S. Provisional Application No. 61/836,394 filed Jun. 18, 2013.

BACKGROUND OF THE INVENTION

This invention relates to the process of using resident microorganisms to change the oil-water relative permeability of oil field reservoirs. More particularly this invention contemplates a method of manipulating resident microorganisms in an oil reservoir through nutrient stimulation and then nutrient limitation. This manipulation thereby improves oil production rate and estimated ultimate recovery (EUR) from the oil reservoir by changing the oil-water relative permeability of the reservoir to a more oil permeable condition.

An objective of the present invention is to provide a method that changes oil-water relative permeability of oil field reservoirs.

Another objective of the present invention is to provide a method of modifying resident microorganisms in an oil reservoir through nutrient stimulation and limitation to improve oil production rates and estimated ultimate recovery from the oil reservoir.

These and other objectives will be apparent to those of ordinary skill in the art based upon the following skill in the art based upon the following written description, drawings and claims.

SUMMARY OF THE INVENTION

A method of increasing oil recovery from oil reservoirs includes the step of conducting a series of lab analysis that lead to a specific nutrient formulation followed by, or in parallel with, a genetic analysis of resident microorganisms in water produced from an oil reservoir to determine if oil interactive microorganisms may be modified to produce a change in oil-water relative permeability of an oil reservoir. The series of analyses are conducted to determine the contents of a specific nutrient formulation package to optimize changes in the resident microorganisms to enhance oil recovery by changing oil-water relative permeability in the oil reservoir. Next the specific nutrient formulation is applied to stimulate some of the resident microorganisms to interact with oil contained in the reservoir rock formations. The stimulation step is followed by limiting the specific nutrient formulation to alter or modify the physiology and surface characteristics of the targeted microorganisms.

DETAILED DESCRIPTION OF PREFERRED EMBODIMENTS

Figure 1:
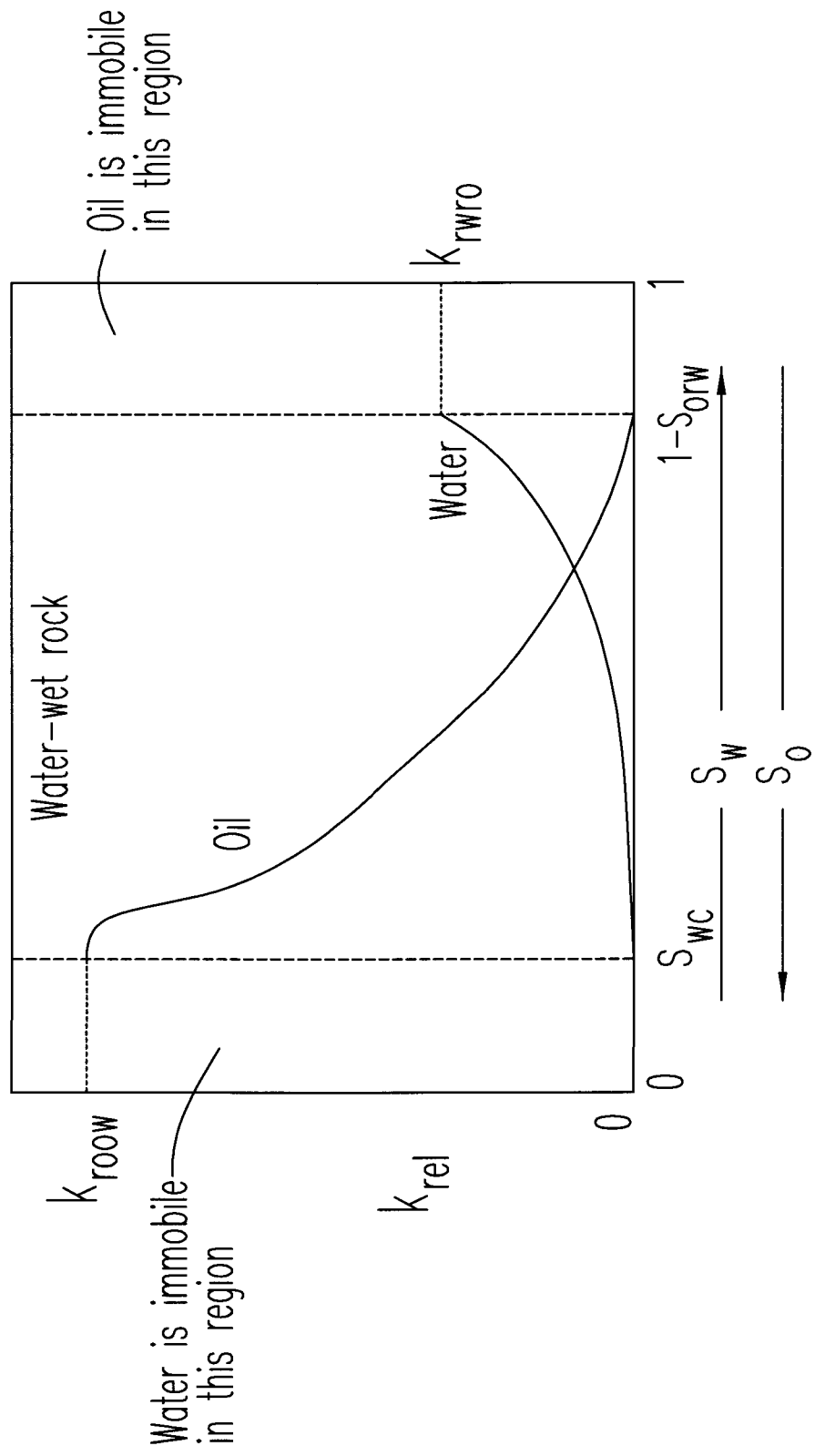
FIG. 1 is a chart of a water layer of a method of enhancing oil recovery.

Disclosed is a method to increase oil recovery from oil reservoirs of all types including, but not limited to, sandstone, carbonate, conglomerate, shale, siltstone or other rock-type.

The method modifies the population of resident microorganisms found in an oil reservoir.

The method of modifying the resident microorganisms is accomplished by applying a specific nutrient formulation to stimulate some of the resident microorganisms to interact with the oil contained in the reservoir rock formation. In one embodiment the nutrient is an organic digest or extract of protein and/or a cell extract of prokaryotic or eukaryotic cells. The nutrients are not derived from sugars (for example molasses).

The step of stimulation of targeting resident microorganisms is followed by specific nutrient limitation that alters the physiology and surface characteristics of the targeted microorganisms. This cycle of nutrient supplementation and limitation may be repeated. In one embodiment, this modification of the resident microorganisms includes changes in size or hydrophobic properties that alter surface-active properties. Typical reductions in microorganism cell volume are 50% or more.

The step of stimulation and modification of the surface oil interactive properties of the resident microorganisms is to a level, which enhances oil recovery. These surface-active properties are such that the interfacial tension and associated oil-water relative permeability are changed.

The introduction of a specific package of nutrients in a liquid form that can be diluted to produce a range of concentrations from 100 grams per liter to 0.0001 grams per liter in the treated volume. Specific packages of nutrients facilitate microbe-mediated oil release in reservoirs where biological life occurs. In one embodiment specific nutrient formulations facilitate microbe-mediated oil release in reservoirs up to 130 C and 150,000 ppm total dissolved solids (TDS).

The method uses a series of analyses that lead to formulation of a specific nutrient package to perform a microbiological response analysis under actual reservoir conditions of the resident population of microorganisms with the intent of refining the treatment of a reservoir to optimize changes in the resident microorganisms that enhance the recovery of oil though altered oil-water relative permeability.

In one form of the method the nutrient formulation stimulates desirable resident microorganisms and suppresses some undesirable resident microorganisms.

The delivery of the nutrient package occurs via both water injection wells and producing wells.

The method also uses genetic analysis of resident microorganisms in produced water to aid in the determination of the presence of the oil interactive microorganisms with the intent of altering oil-water relative permeability.

DEFINITIONS

"Permeability" is a property of the oil reservoir rock and not the fluid that flows through it, provided that the fluid 100% saturates the pore space of the rock. This permeability at 100% saturation is called the absolute permeability of the rock. When two fluids such as oil and water occupy the pore space in specific saturation values then the relative permeability to water and oil is $$k_{rw} = \frac{q_w u_w L}{A(P_1 - P_2)}$$

where $k_{rw}$ = relative permeability to water at a given saturation ($S_w$)

$q_w$ = water flow rate $u_w$ = viscosity of water $L$ = length of a reservoir rock core sample $A$ = cross sectional area of the core sample $P_1$ = Upstream pressure $P_2$ = Downstream pressure $$K_{ro} = \frac{q_o u_o L}{A(P_1 - P_2)}$$

where $k_{ro}$ = relatively permeability to oil at a given saturation ($S_o$)

where $(S_o + S_w) = 100\%$ $q_{ro}$ = oil flow rate $u_o$ = viscosity of oil $L$ = length of reservoir rock core sample $A$ = cross sectional area of the core sample $P_1$ = Upstream pressure $P_2$ = Downstream pressure (Craft and Hawkins, Applied Petroleum Reservoir Engineering, Prentice Hall, 1959).

Figure 2:
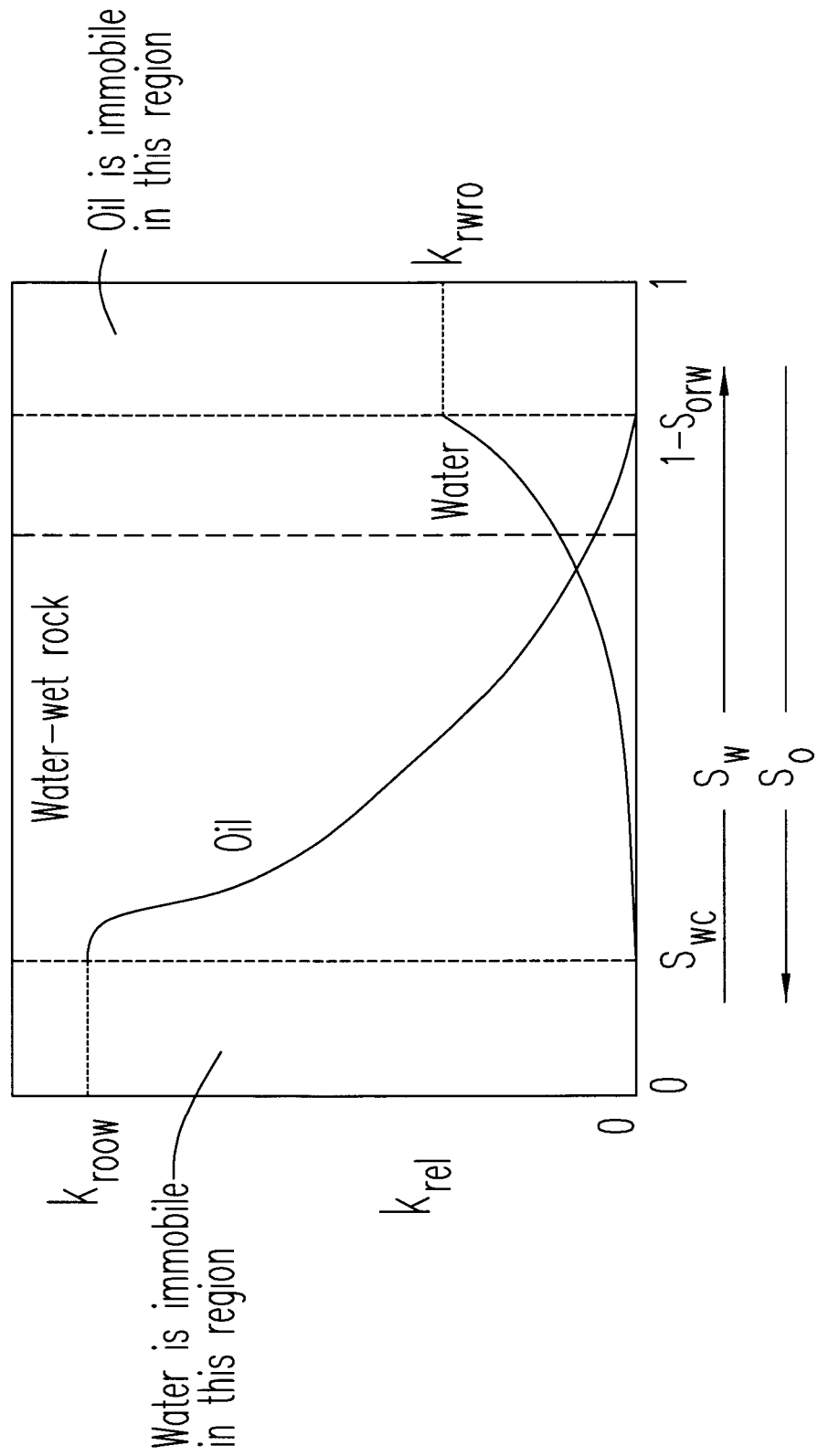
FIG. 2 is a chart of relative permeability of a method of enhancing oil recovery.
Figure 3:
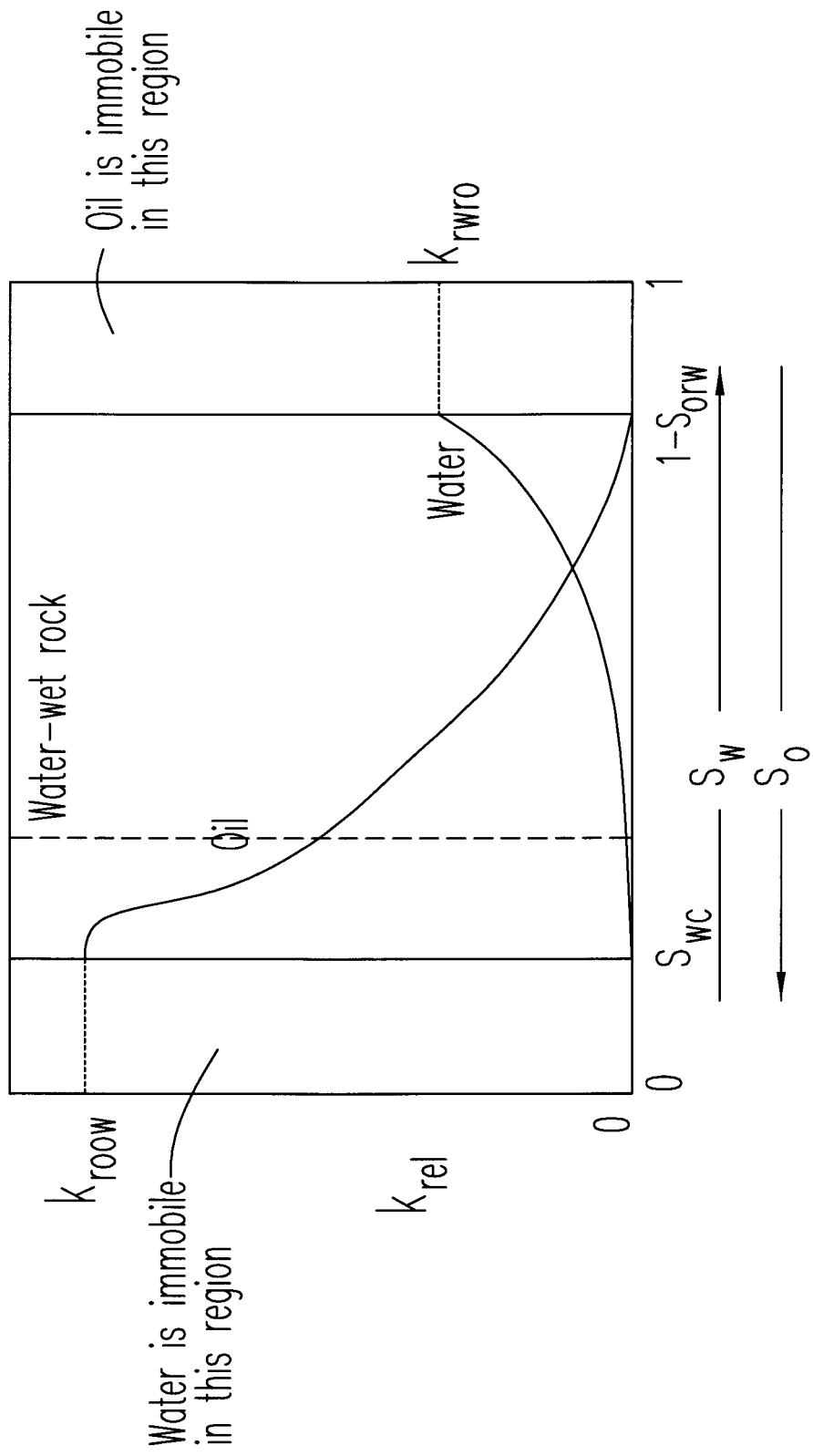
FIG. 3 is a chart of oil release shifts of a method of enhancing oil recovery.
Figure 4:
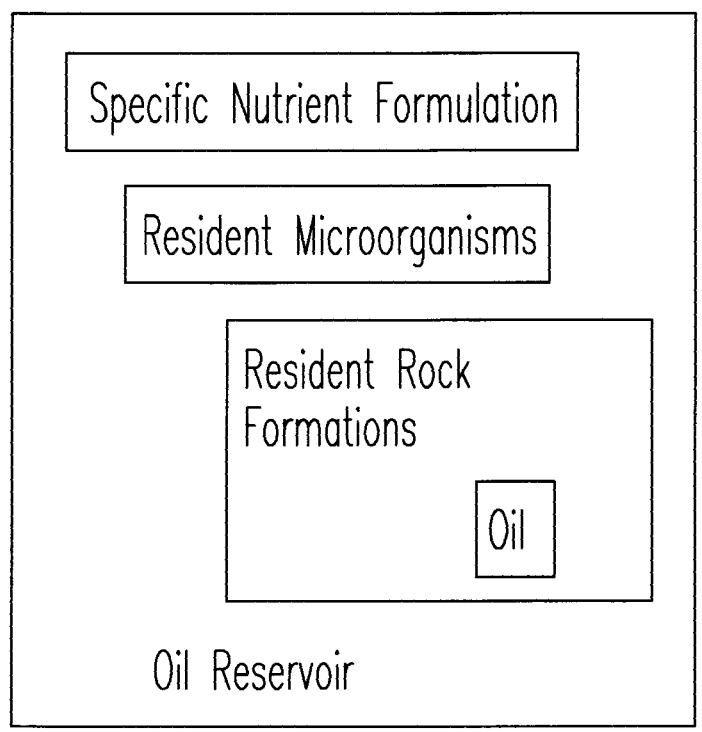
FIG. 4 is a schematic diagram of an environment of performing a method of enhancing oil recovery.
Figure 5:
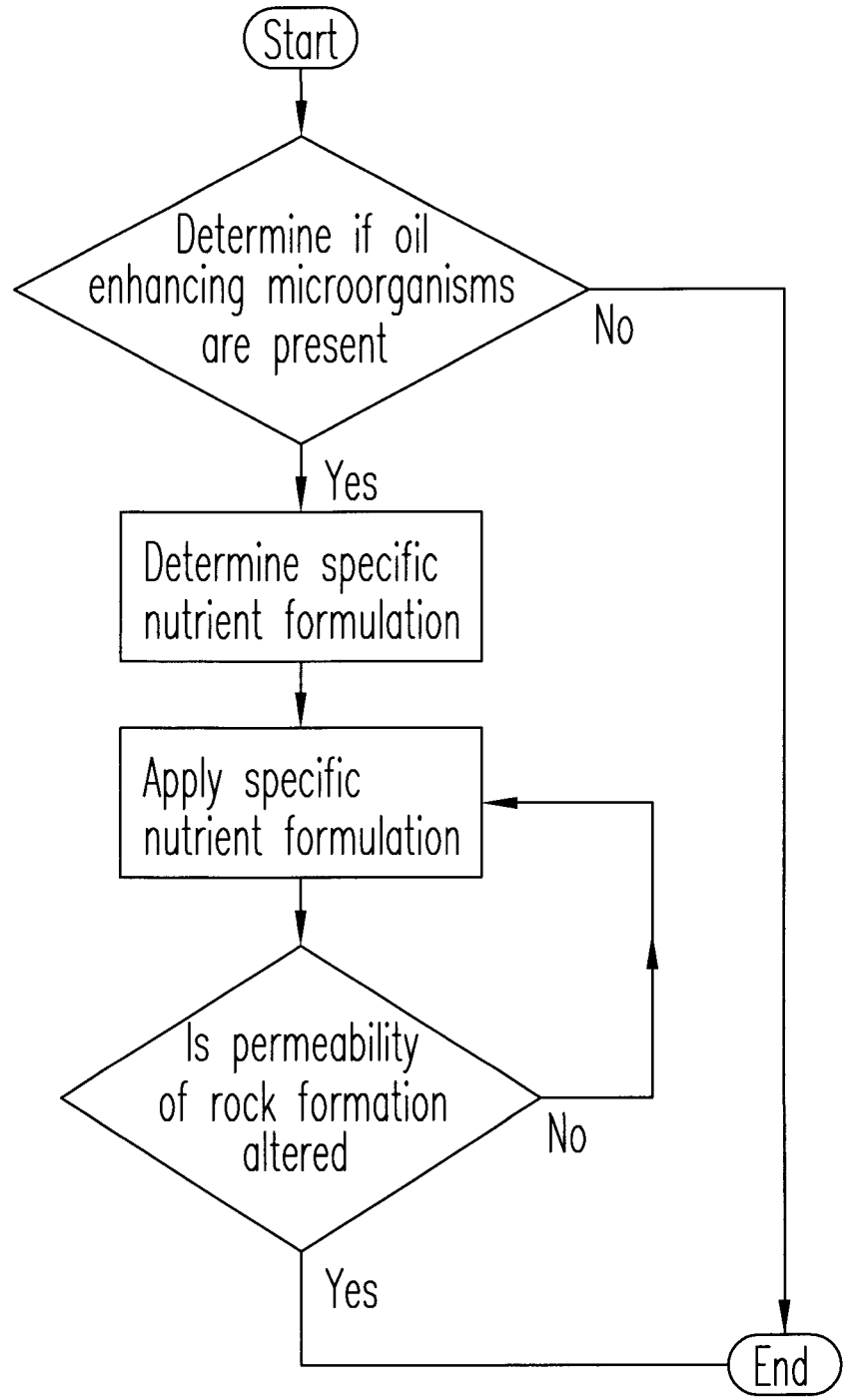
FIG. 5 is a flow diagram of a method of enhancing oil recovery.

FIGS. 1 to 3 show the oil production improvement by increasing the saturation of oil within the treated pore space and moving to a more favorable position on the oil-water relative permeability curve to create a situation more favorable for oil production and recovery.

"Resident Microorganisms" are defined as microorganisms that occur in oil reservoirs, prior to the envisioned treatment, irrespective of the microorganism's origin or where they occur within the oil-bearing strata.

What is claimed:

1. A method of increasing oil recovery from an oil reservoir, comprising the steps of:
    applying a specific nutrient formulation to stimulate targeted resident microorganisms to interact with oil contained in a reservoir rock formation and suppress undesirable targeted resident microorganisms;
    limiting the specific nutrient formulation to alter physiology and surface characteristics of the resident microorganisms;
    repeating the application and limitation of the specific nutrient formulation until oil-water relative permeability of the resident rock formation is altered.

2. The method of claim 1 further comprising the step of conducting a series of analyses to determine the contents of the specific nutrient package.

3. The method of claim 1 wherein surface-active properties of the resident microorganisms are modified.

4. The method of claim 3 wherein interfacial tension and oil-water relative permeability of the surface-active properties are changed.

5. The method of claim 1 wherein a cell volume of the resident microorganisms are reduced by fifty percent or more.

6. The method of claim 1 wherein the specific nutrient package is in liquid form and diluted in a treated volume in a concentration range between 100 grams per liter and 0.0001 grams per liter.

7. The method of claim 1 wherein the specific nutrient formulation facilitates a microbe-mediated oil release in reservoirs up to 130 C and 150,000 ppm total dissolved solids.

8. The method of claim 1 wherein the specific nutrient formulation stimulates desirable resident microorganisms and suppress undesirable resident microorganisms.

9. The method of claim 1 wherein the delivery of the specific nutrient formulation is selected from a group consisting of water injection wells, producing wells, and disposal wells.

10. The method of claim 1 further comprising the step of conducting genetic analysis of the resident microorganisms to determine whether oil interactive microorganisms capable of altering oil-water relative permeability are present.

11. The method of claim 1 wherein the specific nutrient formulation is not derived from sugars.

12. The method of claim 1 wherein the specific nutrient formulation is selected, from a group consisting of an organic digest, an extract of protein, a cell extract of prokaryotic cells, and a cell extract of eukaryotic cells.

* * * * *